(12) United States Patent
Mao et al.

(10) Patent No.: US 7,976,625 B2
(45) Date of Patent: *Jul. 12, 2011

(54) COMPOUNDS AND METHODS FOR TREATING FLY ASH

(75) Inventors: Jianhua Mao, West Chester, OH (US); James H. Irvine, Cincinnati, OH (US)

(73) Assignee: Cognis IP Management GmbH, Duesseldorf (DE)

( * ) Notice: Subject to any disclaimer, the term of this patent is extended or adjusted under 35 U.S.C. 154(b) by 1036 days.

This patent is subject to a terminal disclaimer.

(21) Appl. No.: 11/624,829

(22) Filed: Jan. 19, 2007

(65) Prior Publication Data

US 2007/0204763 A1    Sep. 6, 2007

Related U.S. Application Data

(60) Provisional application No. 60/760,784, filed on Jan. 20, 2006.

(51) Int. Cl.
*C04B 18/06* (2006.01)
*C04B 18/08* (2006.01)

(52) U.S. Cl. .................. 106/705; 106/709; 106/DIG. 1

(58) Field of Classification Search .................. 106/705, 106/709, DIG. 1
See application file for complete search history.

(56) References Cited

U.S. PATENT DOCUMENTS

| | | | |
|---|---|---|---|
| 4,331,447 A * | 5/1982 | Kamada et al. ................ 44/574 |
| 4,453,978 A | 6/1984 | Okimura et al. |
| 5,366,637 A | 11/1994 | Turune |
| 5,766,323 A | 6/1998 | Butler et al. |
| 6,599,358 B1 | 7/2003 | Boggs |
| 6,706,111 B1 | 3/2004 | Young |
| 7,329,397 B2 * | 2/2008 | Hill et al. ...................... 423/237 |
| 7,407,546 B2 * | 8/2008 | Hill et al. ...................... 106/727 |
| 7,485,184 B2 * | 2/2009 | Hill et al. ...................... 106/705 |
| 2004/0144287 A1 * | 7/2004 | Tardif et al. .................... 106/705 |
| 2004/0206276 A1 | 10/2004 | Hill et al. |
| 2007/0204764 A1 * | 9/2007 | Mao et al. ...................... 106/708 |
| 2008/0131344 A1 * | 6/2008 | Hill et al. ...................... 423/238 |
| 2009/0199742 A1 * | 8/2009 | Hill et al. ...................... 106/708 |
| 2009/0199743 A1 * | 8/2009 | Hill et al. ...................... 106/708 |
| 2009/0199744 A1 * | 8/2009 | Hill et al. ...................... 106/708 |
| 2009/0258777 A1 * | 10/2009 | Tardif et al. .................... 501/53 |

FOREIGN PATENT DOCUMENTS

WO    WO 9609902    *    4/1996

OTHER PUBLICATIONS

WO 9609902 (Apr. 4, 1996) Kuromatsu et al. abstract only.*
JP 2001079513 (Mar. 27, 2001) Iizuka et al. abstract only.*
JP 2001079513 (Mar. 27, 2001) Iizuka et al. Machine translation into English language.*

* cited by examiner

*Primary Examiner* — Paul Marcantoni
(74) *Attorney, Agent, or Firm* — Diehl Servilla LLC

(57) ABSTRACT

A compound and method for treating fly ash includes an amphoteric, alkyl polyglycoside, ester, derivative of triglyceride, fatty alcohol, alkoxylated fatty alcohol, alkoxylated polyhydric alcohol, and mixtures thereof, wherein the treated fly ash is incorporated into a cement admixture, and is effective in blocking absorptive carbon. Also, a method is included that reduces the amount of Portland cement by substituting up to 40 by total weight of the cement in a mixture with an equal amount of fly ash treated with an an amphoteric, alkyl polyglycoside, ester, derivative of triglyceride, fatty alcohol, alkoxylated fatty alcohol, alkoxylated polyhdric alcohol, and mixtures thereof.

20 Claims, No Drawings

COMPOUNDS AND METHODS FOR TREATING FLY ASH

CROSS-REFERENCE TO RELATED APPLICATIONS

This application claims priority under 35 U.S.C. §120 from U.S. Provisional Application No. 60/760,784, filed on Jan. 20, 2006, the entire disclosure of which is hereby incorporated by reference.

FIELD OF THE INVENTION

The invention relates generally to concrete additives, and more particularly, to compounds, compositions and methods for treating fly ash used in cement mixtures.

BACKGROUND INFORMATION

The growing demands for concrete in building and construction applications require increased volumes of Portland cement, which is costly. To reduce the amount of Portland cement needed to make concrete, substitute compounds and compositions are needed.

Fly ash is produced from burning pulverized coal in a coal-fired boiler. It is a fine-grained, powdery particulate material that is carried off in the flue gas and may be collected from the gas by electrostatic precipitators or mechanical collection devices, including cyclones. Fly ash is typically disposed of in landfill areas.

Fly ash may be used as an admixture to Portland cement and as a component of a Portland-pozzolan blended cement. When used in concrete, fly ash should have sufficient pozzolanic reactivity and should be of consistent quality. Mixtures of aggregates and binders present in Portland cement, for example, increase the strength, bearing capacity and durability of a structure. Fly ash exhibiting pozzolanic or self-cementing properties may be used as an additive to concrete, and may replace a portion of the cement needed in forming concrete. In addition to the cost savings, the addition of fly ash also improves the properties of concrete, for example, reduced permeability and improved workability.

To be used in Portland cement concrete, fly ash must meet the requirements of the American Society for Testing and Materials, ASTM C-618, which includes Classes N, F and C. Class F, for example, has a carbon content of from 4.8 to 12 percent.

The chemical and physical properties of fly ash are influenced by those of the coal burned and the techniques used for handling. The properties are also influenced by the individual combustion techniques and associated efficiency of the individual boilers.

The four types of coal are anthracite, bituminous, subbituminous and lignite. A principal component of fly ash is determined by the loss on ignition (LOI). LOI is the measurement of the amount of unburned carbon remaining in the fly ash, which indicates the suitability for use as a cement replacement in concrete. Generally, if the LOI is more than 6 percent, the fly ash does not meet ASTM standards and cannot be used for concrete. For example, fly ash which does not meet an individual state Department of Transportation requirement for concrete (generally corresponding to ASTM C-618 or AASHTO 295), is considered "off grade" in that the carbon exceeds, for example, the Ohio, Kentucky, and Indiana state maximum allowable LOI of 3%. Fly ash available from Beckjord Generating Station, a power plant in New Richmond, Ohio, is an example of off-grade fly ash for concrete products.

Other variables, including fineness and variability, are other factors which cause a particular fly ash to fail the ASTM or the American Association of State Highway Transportation Officials (AASHTO) requirements.

Air entrainment is a factor for durability in concrete to resist freezing and thawing conditions in hydraulic cementitious compositions, for example, mortar, masonry and concrete. The presence of entrained air therefore is significant for the long-term durability of concrete or mortar. Entrained air is characterized by substantially uniformly disperse, spherical spaces in cement paste, whereas entrapped air is characterized by irregularly shaped voids which are not generally uniform in size, but are larger than "entrained" air voids. The carbon present in fly ash (and the high carbon content in off-grade fly ash) may adsorb surfactants or "air-entraining" admixtures used in making concrete, thus rendering the surfactants or admixtures unavailable for the intended purpose, and also reducing air entrainment of the cement mixtures. Residual carbon in ash may also interfere with the air entrainment process in forming concrete.

The presence of fly ash in cement mixtures or concrete has several advantages, including the reduction of fly ash disposed in landfill, thus protecting natural resources, lower cost than other additives, and it decreases permeability and shrinkage in the hardened concrete. Other advantages include durability and long-term strength gain, in that there is reduced dry shrinkage, reduced heat of hydration, water reduction, reduced alkali silica reactivity, and increased resistance to sulfate attack. In addition, the workability is improved, in that there is reduced bleeding and segregation, improved flowability, and improved finishing characteristics. Additionally, there is the reduction of carbon dioxide by the replacement of a portion of the cement.

A need remains for a compound, composition and method for treating fly ash for use in cementitious compositions.

SUMMARY OF THE INVENTION

Briefly described, according to an aspect of the invention, a compound for treating fly ash is selected from an amphoteric, an alkyl polyglycoside, an ester, a triglyceride derivative, a fatty alcohol, an alkoxylated fatty alcohol, an alkoxylated polyhydric alcohol, and mixtures thereof, wherein when the fly ash is treated and incorporated into a cement admixture, the treated fly ash is effective in blocking absorptive carbon.

According to another aspect of the invention, a method for treating fly ash in a cementitious mixture includes treating fly ash with a compound selected from the group consisting of an amphoteric, an alkyl polyglycoside, an ester, a derivatives of triglyceride, a fatty alcohol, an alkoxylated fatty alcohol, an alkoxylated polyhydric alcohol, and mixtures thereof.

According to another aspect of the invention, a method for reducing the amount of Portland cement in a cementitious mixture includes substituting up to forty percent by total weight of the Portland cement in a cementitious mixture with an equal amount of fly ash treated with a compound selected from the group consisting of an amphoteric, an alkyl polyglycoside, an ester, a derivatives of triglyceride, a fatty alcohol, an alkoxylated fatty alcohol, an alkoxylated polyhydric alcohol, and mixtures thereof.

DETAILED DESCRIPTION OF THE INVENTION

According to an aspect of the invention, a compound for treating fly ash is selected from an amphoteric, an alkyl polyglycoside, an ester, a triglyceride derivative, a fatty alcohol, an alkoxylated fatty alcohol, an alkoxylated polyhydric alcohol, and mixtures thereof, wherein when the fly ash is treated and incorporated into a cement admixture, the treated fly ash is effective in blocking absorptive carbon. The compound may be amphoteric, and may also be a betaine. The compound may be an alkyl polyglycoside, and may also be a $C_8$-$C_{18}$ alkyl polglycoside or a $C_8$-$C_{12}$ alkyl polglycoside. The compound may be an ester, and may also be a triglyceride. The triglyceride may contain alkyl chains with 4-22 carbons, or an alkyl chain containing from 14-18 carbons. The triglyceride may be an oil selected from rapeseed oil, soybean oil, coconut oil, tall oils, and mixtures thereof The compound may be a triglyceride derivative, and may be an alkoxylated triglyceride or an ethoxylated triglyceride. The compound may be a fatty alcohol. The compound may be an alkoxylated fatty alcohol. The compound may be an alkoxylated polyhydric alcohol.

According to another aspect of the invention, a method for treating fly ash in a cementitious mixture, includes treating fly ash with a compound selected from an amphoteric, an alkyl polyglycoside, an ester, a derivatives of triglyceride, a fatty alcohol, an alkoxylated fatty alcohol, an alkoxylated polyhydric alcohol, and mixtures thereof The fly ash may be off-grade fly ash.

According to another aspect of the invention, a method for reducing the amount of Portland cement in a cementitious mixture, includes substituting up to forty percent by total weight of the Portland cement in a cementitious mixture with an equal amount of fly ash treated with a compound selected from an amphoteric, an alkyl polyglycoside, an ester, a derivatives of triglyceride, a fatty alcohol, an alkoxylated fatty alcohol, an alkoxylated polyhydric alcohol, and mixtures thereof As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "or" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done merely for convenience and to give a general sense of the invention. The description herein should be read to include one or at least one and the singular also includes the plural unless indicated to the contrary.

Advantageously, applicants have found that the treatment of off-grade fly ash using the compound or composition according to the invention improves air entrainment in cement mixtures, and may be used to replace a portion of the amount of Portland cement required in concrete applications. The compounds and compositions for treating fly ash according to an aspect of the invention include, but are not limited to: an amphoteric, an alkyl polyglycoside, an ester, a triglyceride derivative, a fatty alcohol, an alkoxylated fatty alcohol, an alkoxylated polyhydric alcohol, and mixtures thereof. The treatment of fly ash using the compounds, compositions and methods described herein eliminates the anti-air entrainment effect of residual carbon present in the fly ash without increasing the air entrainment effect by the compound and compositions alone.

A suitable amphoteric compound includes, but is not limited to, DEHYTON K. DEHYTON K is a cocoamide propyl betaine and is available from Cognis Deutschland in Germany. Other suitable amphoteric compounds may also be used, including but not limited, to N-alkyl-N,N-dimethyl ammonium glycinates, for example cocoalkyl dimethyl ammonium glycinate, N-acylaminopropyl-N,N-dimethyl ammonium glycinates, for example coco-acylaminopropyl dimethyl ammonium glycinate, and 2-alkyl-3-carboxymethyl-3-hydroxyethyl imidazolines containing 8 to 18 carbon atoms in the alkyl or acyl group and cocoacyl-aminoethyl hydroxyethyl carboxymethyl glycinate, such as DEHYTON AB 30 coco betaine (CAS# 68424-94-2).

A suitable alkyl polyglycoside includes, but is not limited to, AGNIQUE PG 8107. AGNIQUE PC 8107 is a $C_8$-$C_{10}$ alkyl polyglucoside, with a degree of polymerization (D.P.) of 1.7 and is available from Cognis Deutschland in Germany or Cognis Corporation in the U.S. Other suitable alkyl polyglycosides may also be used to treat fly ash, including AGNIQUE PG 8105, a $C_8$-$C_{10}$ alkyl polyglucoside, with a degree of polymerization (D.P.) of 1.5, AGNIQUE 9116, which is a $C_9$-$C_{11}$ alkylpolyglucoside with DP=1.6, AGNIQUE PG 264, a $C_{12}$-$C_{16}$ alkylpolyglucoside with DP=1.4, all of which are available from Cognis Deutschland, Germany or Cognis Corporation in the U.S.

A suitable ester includes, but is not limited to, Cognis-34072. Cognis-34072 is a triglyceride, which may be derived from natural or synthetic sources. The alkyl chains in the triglyceride may contain from $C_4$-$C_{22}$ carbon atoms. Suitable triglycerides may also include vegetable oils, including, but not limited to, rapeseed oil, soybean oil, coconut oil, tall oils, and mixtures thereof Other suitable esters include, but are not limited to, esters of monohydric and polyhydric alcohols with linear or branched fatty acids, and mixtures thereof. Fatty acids include, but are not limited to, linear and branched fatty acids with from $C_{4-22}$ carbons in the alkyl chain, and mixtures thereof Monohydric alcohols include, but are not limited to, methanol, ethanol, butanol, propanol, isopropanol, isobutanol, tert-butanol, and mixtures thereof. Polyhdric alcohols include, but are not limited to, ethylene glycol, diethylene glycol, trithylene glycol, 1,2 propylene glycol, 1,3 propylene glycol, 1,4 butylene glycol, glycerol, polyoxyethylene glycols, polyoxypropylene glycols, sorbitol, and mixtures thereof Esters of polyhydric alcohols include, but are not limited to, complete and partial esters. A partial ester of a polyhydric alcohol includes, but is not limited to, glycerol monooleate, glycerol dioleate, glycerol monostearate, glycerol monoisostearate, and mixtures thereof.

A suitable triglyceride derivative includes, but is not limited to, an alkoxylated triglyceride, including an ethoxylated triglyceride. The degree of alkoxylation is in the range of 0-200 moles of at least one alkylene oxide selected from the group consisting of ethylene oxide, propylene oxide, butylene oxide, and combinations thereof per mole of triglyceride. Suitable ethoxylated triglycerides include, but are not limited to, AGNIQUE SBO-5, AGNIQUE SBO-10, AGNIQUE SBO-20, AGNIQUE CSO-16, AGNIQUE CSO-25, AGNIQUE RSO-5, AGMQUE RSO-10 and AGNIQUE RSO-30.

A suitable fatty alcohol includes, but is not limited to, a fatty alcohol with an alkyl chain containing from 6-22 carbons or mixtures thereof. The alkyl chain may be either linear or branched or mixtures thereof. A suitable fatty alcohol includes a $C_8$ alcohol, LOROL C8-98, from Cognis Corporation, a $C_{8-10}$ alcohol, LOROL C8-10SPV from Cognis Corporation, or a $C_{12-14}$ fatty alcohol, LOROL C12-14A from Cognis Corporation, or isostearyl alcohol.

A suitable alkoxylated fatty alcohol includes, but is not limited to, fatty alcohols with alkyl chains containing from 6-22 carbons or mixtures thereof The fatty alcohol may be alkoxylated with from 0-200 moles of at least one alkylene oxide selected from the group consisting of ethylene oxide, propylene oxide, butylene oxide, and combinations thereof per mole of alcohol. For example, a suitable alkoxylated fatty alcohol may contain an average of about 5 moles of ethoxylate per mole of alcohol. Alternatively, a suitable alkoxylated fatty alcohol includes, but is not limited to, a $C_{6-12}$ alcohol with on average 5 moles of ethylene oxide and a $C_{16-18}$ fatty alcohol with, on average, 5 moles of ethylene oxide.

A suitable alkoxylated polyhydric fatty alcohol includes, but is not limited to, ethylene glycol, diethylene glycol, triethylene glycol, 1,2-propylene glycol, polyoxypropylene glycols, 1,3-propylene glycol, 1,4-butylene glycol, pentane-1,5-diol, hexane-1,6-diol, hexane-1,2,6-triol, glycerol and bis-(4-hydroxycyclohexyl)-2,2-propane. The polyhydric alcohol may be, but is not limited to, dihydric, trihydric, tetrahydric and pentahydric alcohols.

The polyhydric alcohol may be alkoxylated with 0-200 moles of at least one alkylene oxide selected from the group consisting of ethylene oxide, propylene oxide, butylene oxide, and combinations thereof per mole of alcohol. For example, a suitable alkoxylated polyhydric alcohol may contain an average of about 15 moles of ethoxylate and about 60 moles of propoxylate per mole of alcohol. It should be understood that when an alcohol is alkoxylated and includes at least 5 moles of EO, a distribution of ethoxylates will be present, ranging from 0 moles of EO, an average of 5 moles of EO and up to 10-14 moles of EO.

The compounds described above may be used individually or in a mixture (composition). In one aspect of the invention, a mixture of an alkyl polyglucoside and an amphoteric is provided in a ratio of 0.1% to 0.5%, and also in a ratio of 0.1% to 1.0%. In another aspect of the invention, the triglyceride is blended with sodium lauryl sulfate, or an alkoxylated fatty alcohol.

A suitable ratio of fly ash to Portland cement according to the invention may be 5:95 to 25:75 Other suitable ratios include 20:80 and also 15:85. It should be understood that currently under most Department of Transportation (DOT) regulations in many states, the replacement of cement is limited to a maximum of 20:80. Although the ratio of 20:80 is not presently exceeded, it is possible that it may be extended in the future, depending of course upon the individual states' DOT regulations. Therefore, the upper maximum fly ash replacement according to an aspect of the invention would suitably be 40:60.

Unless otherwise defined, all technical and scientific terms used herein have the same meaning as commonly understood by one of ordinary skill in the art to which the invention belongs. Although methods and materials similar or equivalent to those described herein can be used in the practice or testing of the invention, suitable methods and materials are described below. In case of conflict, the present specification, including definitions, will control. In addition, the materials, methods and examples are illustrative only and are not intended to be limiting.

EXAMPLES

Example 1

In the following Example, concrete mixtures were prepared using conventional industry procedures. In each Example, 18.9 lbs. of Portland cement, 3.3 lbs. fly ash (either treated or untreated by an agent), 48.1 lbs. sand, 59.3 lbs. gravel, 9.9 ml of an air entrainment agent (MICRO-AIR) and 26 ml of a water reducer (POZZOLITH 200N) available from Master Builders (a division of DeGussa) in Cleveland, Ohio and about 9.5 lbs. of water were mixed in a concrete mixer. It is to be understood that the concrete mixture may be made in other suitable mixing devices, or by manual mixing.

After the concrete mixtures were prepared, the air content, slump and other properties were measured. Air content was measured according to ASTM C-231 and slump was measured according to ASTM C-143.

The untreated fly ash used in the examples is off-grade fly ash. Untreated fly ash used directly will provide a concrete mixture with low air entrainment of less than three percent (3%) when used to replace about 10-15 percent (10-15%) of the Portland cement, based on the total original weight of Portland cement.

The fly ash was treated as follows: Untreated fly ash was mixed with a compound according to the invention at a ratio of 0.1 oz to 2.0 oz per 20 lb fly ash in an inline mixer device at a temperature ranging between 15-100° C. In the Examples, the temperature range was between 30-75° C. It is to be understood that the mixing devices and methods used can vary and are not limited to the devices and methods described herein, as a skilled artisan will appreciate. Regardless of the device and method used, the compound(s) should be distributed evenly into the fly ash. Alternatively, the compound(s) may be added subsequently to the concrete mixture described above that includes untreated fly ash.

As illustrated in Table 1 below, a concrete mixture in which fifteen percent (15%) of the Portland cement was replaced with untreated off-grade fly ash had an air entrainment value of less than two percent (2%), as measured according to the method of ASTM C-231. In Table 1, the fly ash is treated with a compound prior to adding to the cement mixture.

TABLE 1

| Compounds | Appl. Rate oz./20 lb | Results, air % in concrete |
| --- | --- | --- |
| No treatment | 0 oz/20 lb | <2% |
| DEHYTON K | 2 oz/20 lb | 13% |
| (AGNIQUE AMP) | 1 oz/20 lb | 11% |
| AGNIQUE PG 8107 (Agrimul PG) | ½ oz/20 lb | 5% |
| Cognis-34072, triglycerides | 0.22 oz/20 lb | 4.5% |
| Cognis-34072, triglycerides | 0.56 oz/20 lb | 5.25% |

As illustrated in Table 1, fly ash treated with a compound according to the invention significantly improved air entrainment in cement mixtures.

Example 2

All concrete mixes in Examples 2a -2c were prepared using the following:

| | Source | Amount | Volume, cu ft. |
| --- | --- | --- | --- |
| Cement (lbs) | Type I Portland | 18.89 | 0.10 |
| Fly Ash (lbs) | Various | 3.33 | 0.02 |
| Coarse Aggregate (lbs) | #57 LS | 64.45 | 0.40 |
| Fine Aggregate (lbs) | Hilltop GR | 43.81 | 0.26 |
| Water (lbs) | | 10.00 | 0.16 |
| Air (%) | | 6.0 | 0.06 |
| Water Reducer (mls) | MB Pozz 200 N | 26.3 | |
| Air Entraining Agent (mls) | MB Micro Air | 6.6 | |
| Total | | 140.5 | 1.00 |

In cases where ordinary Portland cement mix was made, all fly ash in the above formulas was replaced with an equal amount of Type I Portland cement.

Procedure Used to Prepare Concrete Mixture:

The above components were added while mixing in a concrete mixer: ½ the amount of water; Coarse aggregate; Water Reducer agent; Fine Aggregate; Air Entraining Agent; Fly Ash; Cement; the remainder (½) of water. The mixture was combined for approximately three minutes, covered, and allowed to rest. The mixture was combined an additional two minutes and discharged from the mixer.

Fly Ash Method of Treatment with Treatment Agent:

The treatment agent may be mixed with the fly ash in any manner conventional in the art to effectively distribute the agent on the surface of the fly ash. The methods include, but are not limited to mechanical mixers of various designs and other technologies that provide for uniform mixing of liquids on powders.

Example 2a

Concrete samples were prepared utilizing one source of fly ash. In this example, various treatment agents were compared by treating the fly ash with the treatment agent as described above. The treatment level was 0.14% by wt. of treatment agent to fly ash in each case. Two batches receiving the above treatment were made and analyzed for slump (ASTM C143), Air Content (ASTM C231), 28-day compressive strength (ASTM C39) and Microscopical Air Void analysis (ASTM C457) with the following exceptions: (1) fly ash was not treated with an agent in 341-U and 342-U; (2) fly ash and agent were omitted in 345-U and 346-U; (3) Portland cement was treated with an agent in 357-P and 358-P; and (4) a treatment agent was added as an admixture to the concrete mix but was not used to pretreat the fly ash in 343-P and 344-P. Results can be found in Table 2.

TABLE 2

| Mix ID No. | Compound/Blend | C 143 Slump (in) | C 231 Corrected Air % | C 39 28 Day Compress Strength (psi) | ASTM C-457 Total Air Void Content % | Voids > 1 mm % | Specific Surface Area in 2/in 3 | Spacing factor, in | Void Freq., voids/in |
|---|---|---|---|---|---|---|---|---|---|
| 341-U | Fly Ash control | 3 | 3.4% | 6235 | 2.69 | 0.47 | 1334 | 0.0048 | 9 |
| 342-U | Fly Ash control | 3¾ | 3.7% | 5900 | | | | | |
| 345-U | Portland cement only | 3½ | 4.8% | 5925 | 3.98 | 1.02 | 1045 | 0.0051 | 0.4 |
| 346-U | Portland cement only | 3 | 5.4% | 5695 | | | | | |
| 355-P | SBO | 4 | 5.9% | 4665 | 6.75 | 1.01 | 1403 | 0.003 | 23.7 |
| 356-P | SBO | 4 | 5.8% | 4640 | | | | | |
| 351-P | SBO-10 | 3½ | 5.6% | 4965 | 6.69 | 0.67 | 1209 | 0.0031 | 20.2 |
| 352-P | SBO-10 | 3¼ | 5.4% | 5210 | | | | | |
| 343-U | SBO-10 as admix | 3 | 2.5% | 6175 | 2.97 | 0.82 | 663 | 0.0093 | 4.9 |
| 344-U | SBO-10 as admix | 2½ | 2.3% | 6640 | | | | | |
| 339-P | SBO-30 | 4½ | 6.5% | 4505 | 7.21 | 1.31 | 1503 | 0.0024 | 7.1 |
| 340-P | SBO-30 | 4¼ | 6.5% | 4405 | | | | | |
| 325-P | SBO-42 | 3¾ | 7.8% | 4030 | 5.66 | 0.51 | 1321 | 0.0033 | 18.7 |
| 326-P | SBO-42 | 4 | 7.2% | 4370 | | | | | |
| 327-P | NP-9 | 4¼ | 5.5% | 5205 | 4.49 | 0.21 | 812 | 0.0063 | 9.1 |
| 328-P | NP-9 | 3¾ | 5.8% | 5110 | | | | | |
| 335-P | SBO-10/NP-9 | 3 | 5.4% | 5280 | 5.43 | 0.57 | 1369 | 0.0033 | 8.6 |
| 336-P | SBO-10/NP-9 | 2½ | 4.0% | 6080 | | | | | |
| 333-P | SBO-10/SLS | 3¼ | 5.8% | 4710 | 5.04 | 0.58 | 1535 | 0.0031 | 9.4 |
| 334-P | SBO-10/SLS | 3 | 5.8% | 5035 | | | | | |
| 337-P | Oleic Acid | 2¼ | 4.2% | 5900 | 3.7 | 1.03 | 980 | 0.0055 | 9.1 |
| 338-P | Oleic Acid | 2 | 3.7% | 6195 | | | | | |
| 331-P | C8 alcohol | 4½ | 6.2% | 4495 | 6.22 | 0.68 | 1228 | 0.0034 | 9.1 |
| 332-P | C8 alcohol | 5½ | 6.2% | 4535 | | | | | |
| 347-P | C12-14 alcohol | 3¾ | 6.3% | 4535 | 4.78 | 0.37 | 1250 | 0.0037 | 15 |
| 363-P | C12-14 alcohol | 2¼ | 4.8% | 5700 | | | | | |
| 329-P | POE(5)C6-12 alcohol | 3¾ | 12.0% | 2575 | | | | | |
| 330-P | POE(5)C6-12 alcohol | 3½ | 8.9% | 3680 | 6.24 | 0.56 | 1355 | 0.0035 | 21.1 |
| 323-P | POE(5)Oleyl/Cetyl alcohol | 4 | 6.1% | 5190 | 4.94 | 0.65 | 1244 | 0.004 | 15.4 |
| 324-P | POE(5)Oleyl/Cetyl alcohol | 4½ | 6.1% | 4880 | | | | | |
| 349-P | POE(15)POP(60) Glycerine | 4 | 5.7% | 5320 | | | | | |
| 350-P | POE(15)POP(60) Glycerine | 4¼ | 5.6% | 5045 | 5.31 | 0.88 | 1156 | 0.0038 | 15.4 |
| 353-P | MB Micro Air | 3½ | 3.9% | 5980 | 3.39 | 0.63 | 1506 | 0.004 | 12.8 |
| 354-P | MB Micro Air | 4 | 4.0% | 5785 | | | | | |
| 357-P | SBO-10 on cement | 4 | 1.9% | 6480 | | | | | |
| 358-P | SBO-10 on cement | 3 | 3.6% | 6385 | 4.08 | 0.76 | 633 | 0.0081 | 6.5 |

SBO = Soybean Oil; SBO-10 = POE(10)Soybean Oil; SBO-30 = POE(30)Soybean Oil; SBO-42 = POE(42)Soybean Oil; NP-9 = POE(9) Nonyl Phenol; SBO-10/NP-9 = 95% SBO-10/5% NP-9; SBO-10/SLS = 95% SBO-10/5% Sodium Lauryl Sulfate; All Alcohols are linear alcohols.

Based on the results in Table 2, the fly ash must be pretreated separately with a compound or blend of compounds according to the invention to be effective. Otherwise, the materials are ineffective in blocking adsorptive carbon if added, for example, to the concrete admixture or applied onto Portland cement. For example, as indicated in Table 2, NP-9 alone (327 and 328) did not produce the desired air structure (lower surface area, low void frequency and higher spacing factor were observed) but a blend of SBO-10 and SLS (333 and 334) or NP-9 (335 and 336) was effective in blocking adsorptive carbon and provided good air structure. The standard air entraining agent available as MB Micro Air (353 and 354) and oleic acid (337 and 338) were not as effective as the compounds and blends according to the invention.

It is also observed that with regard to ethoxylated triglycerides, the greater the degree of ethoxylation, the greater the percentage of air content (351-P), (352-P), (339-P, (340-P), (325-P) and (326-P). Also, for the same amount of EO, the lower chain alcohol (329-P and 330-P) provides more air than the longer chain alcohol (323-P and 324-P). This trend with alkyl chain length and air content is also observed for the fatty alcohols, (331-P) and (332-P) versus (347-P and 363-P). In addition, the EO/PO block polymer of polyhydric alcohls (349-P and 350-P) are effective in blocking adsorptive carbon.

Example 2b

Concrete samples were prepared utilizing fly ash from 6 different sources using the mix design and procedure above. In each pair of samples, one was prepared with treated fly ash and one with untreated fly ash. The treatment agent in this example was an ethoxylated triglyceride, POE(10) Soybean oil and the treatment method was as described above. The treatment level was 0.14% by wt. of treatment agent to fly ash. Concrete specimens were cast into cylinders and tested for Air Void analysis by ASTM C457. Results of these analyses are reported in Table 3.

TABLE 3

| | | | ASTM C-457 | | | |
|---|---|---|---|---|---|---|
| Fly Ash Treatment | Source | LOI % | Air Content % | Voids > 1 mm | Specific Surface Area in 2/in 3 | Spacing Factor in | Void Freq. |
| Untreated | A | 3.03 | 5.19 | 1.82 | 932 | 0.0049 | 12.1 |
| Treated | A | 3.03 | 5.48 | 0.85 | 1645 | 0.0026 | 22.6 |
| Untreated | B | 6.88 | 3.25 | 0.83 | 1203 | 0.0047 | 9.8 |
| Treated | B | 6.88 | 3.98 | 0.52 | 1692 | 0.0031 | 16.9 |
| Untreated | C | 1.68 | 3.88 | 1.19 | 875 | 0.006 | 8.5 |
| Treated | C | 1.68 | 7.93 | 1.04 | 1333 | 0.0022 | 26.4 |
| Untreated | D | 5.53 | 3.14 | 0.41 | 1688 | 0.0034 | 13.3 |
| Treated | D | 5.53 | 7.30 | 0.72 | 1515 | 0.0025 | 27.6 |
| Untreated | E | 6 | 2.79 | 1.03 | 1114 | 0.0054 | 7.8 |
| Treated | E | 6 | 2.70 | 0.36 | 1505 | 0.0043 | 10.2 |
| Untreated | F | 6.98 | 2.40 | 1.30 | 505 | 0.0134 | 3 |
| Treated | F | 6.98 | 4.33 | 0.72 | 1425 | 0.0035 | 15.4 |

Based on the data in Table 3, the smaller air bubble structure and improved spacing pattern is believed advantageous to the performance and quality of air entrained concrete (improved freeze-thaw performance). Treatment with ethoxylated triglycerides provides (1) on average, smaller air bubbles (voids >1 mm lower) in treated vs. untreated fly ash; (2) on average, treatment provides higher air void surface area; and (3) on average, bubbles are spaced closer together. Both (2) and (3) represent a trend with increased number of smaller bubbles.

Example 2c

Concrete samples were prepared by the mix design given above using fly ash from the same source. Twelve samples were prepared using fly ash treated with soybean oil and twelve with fly ash treated with ethoxylated soybean oil. Two treatment levels were used. On these samples were run a slump test, air content, and 7 and 28 day compressive strength (average of two replicates). Based on the air content and compressive strength data obtained, an equation for the relationship between % air and compressive strength was developed. This equation was then used to normalize all the compressive strengths to a 6% air content basis. The average corrected compressive strength for each treatment agent was then calculated. The results are reported in Table 4.

TABLE 4

| Mix ID Number | Fly Ash Source | Treatment Agent | Treatment Dosage, % | Fly Ash LOI | Slump (in) | Air % | Average 7 day (psi) | Avg. 7 day normalize to 6% air | Average 28 day | Avg. 28 day nomalize to 6% air |
|---|---|---|---|---|---|---|---|---|---|---|
| 162-P | A | SBO-10 | 0.15 | 3.13 | 4½ | 3.8% | 3665 | 3146 | 4475 | 3764 |
| 163-P | A | SBO-10 | 0.15 | 3.13 | 3¼ | 3.4% | 3750 | 3136 | 5000 | 4289 |
| 164-P | A | SBO-10 | 0.15 | 3.13 | 3½ | 3.6% | 3650 | 3084 | 4755 | 4044 |
| 165-P | A | SBO-10 | 0.15 | 3.13 | 4¼ | 3.6% | 3740 | 3174 | 4790 | 4079 |
| 170-P | A | SBO-10 | 0.13 | 3.13 | 3½ | 5.4% | 3250 | 3108 | 4145 | 3434 |
| 171-P | A | SBO-10 | 0.13 | 3.13 | 3½ | 2.3%** | 4045** | 3172 | 5270** | 4559 |
| 172-P | A | SBO-10 | 0.13 | 3.13 | 4 | 6.4% | 2870 | 2964 | 3770 | 3059 |
| 173-P | A | SBO-10 | 0.13 | 3.13 | 4¾ | 6.6% | 2860 | 3002 | 3750 | 3039 |
| 179-P | A | SBO-10 | 0.15 | 2.84 | 3½ | 6.0% | 3235 | 3235 | 4035 | 3324 |
| 180-P | A | SBO-10 | 0.15 | 2.84 | 4¾ | 6.8% | 3090 | 3279 | 3805 | 3094 |
| 181-P | A | SBO-10 | 0.15 | 2.84 | 5½ | 7.8% | 2860 | 3285 | 3525 | 2814 |
| 182-P | A | SBO-10 | 0.15 | 2.84 | 5½ | 7.4% | 2765 | 3095 | 3515 | 2804 |
| | | | | | | | Avg. | 3137 | | 3432 |
| 166-P | A | SBO | 0.15 | 3.13 | 3¾ | 5.2% | 3200 | 3011 | 4210 | 3499 |
| 167-P | A | SBO | 0.15 | 3.13 | 4¼ | 5.4% | 3065 | 2923 | 4100 | 3389 |
| 168-P | A | SBO | 0.15 | 3.13 | 4 | 5.4% | 3215 | 3073 | 4020 | 3309 |
| 169-P | A | SBO | 0.15 | 3.13 | 4 | 5.4% | 3080 | 2938 | 4105 | 3394 |
| 174-P | A | SBO | 0.13 | 3.13 | 3¾ | 5.7% | 3355 | 3284 | 4200 | 3489 |
| 175-P | A | SBO | 0.13 | 3.13 | 3½ | 5.4% | 3330 | 3188 | 4195 | 3484 |
| 176-P | A | SBO | 0.13 | 3.13 | 4¼ | 6.1% | 3000 | 3024 | 3960 | 3249 |
| 177-P | A | SBO | 0.13 | 3.13 | 3¾ | 5.4% | 3265 | 3123 | 4285 | 3574 |
| 183-P | A | SBO | 0.15 | 2.84 | 3½ | 5.9% | 3220 | 3196 | 3840 | 3129 |
| 184-P | A | SBO | 0.15 | 2.84 | 3¼ | 5.5% | 3265 | 3147 | 4070 | 3359 |
| 185-P | A | SBO | 0.15 | 2.84 | 3¼ | 5.4% | 3300 | 3158 | 4275 | 3564 |
| 186-P | A | SBO | 0.15 | 2.84 | 3¼ | 5.0% | 3550 | 3314 | 4045 | 3334 |
| | | | | | | | Avg | 3115 | | 3398 |

**values are omitted from average due to lack of air entrainer addition.

Based on the results in Table 4, treatment with a triglyceride or an ethoxylated triglyceride provides similar compressive strength results (when normalized to constant air content). Both treatment agents are effective in blocking interference of carbon in air entrainment. If no air entrainment agent is added, a poor air mix is achieved (171-P). The triglyceride and ethoxylated triglyceride provides sequestration of carbon interference in AE. There is no difference in compressive strength between the treatment agents when the percentage of air is adjusted.

The invention has been described with reference to specific embodiments. One of ordinary skill in the art, however, appreciates that various modifications and changes can be made without departing from the scope of the invention as set forth in the claims. For example, alkoxylated triglycerides and alkoxylated fatty acids are described as useful for treating fly ash. In addition, a suitable alkoxylated fatty acid useful for treating fly ash may include, but is not limited to AGNIQUE FAC 181-6 (6 mole ethoxylated oleic acid).

While the examples used off-grade fly ash, other grades of fly ash may be suitable for treating according to the invention. Accordingly, the specification is to be regarded in an illustrative manner, rather than a restrictive view and all such modifications are intended to be included within the scope of the invention.

Benefits, other advantages, and solutions to problems have been described above with regard to specific embodiments. The benefits, advantages, solutions to problems and any element(s) that may cause any benefit advantage, or solution to occur or become more pronounced are not to be construed as a critical, required, or essential feature or element of any or all of the claims.

What is claimed is:

1. A method for treating fly ash in a cementitious mixture, comprising the steps of:
   (a) treating fly ash with a compound selected from the group consisting of amphoterics, alkyl polyglycosides, triglycerides, derivatives of triglycerides, fatty alcohols, alkoxylated fatty alcohols, alkoxylated polyhydric alcohols, and mixtures thereof, to form a treated fly ash; and
   (b) adding said treated fly ash to a cementitious mixture, wherein said treatment of said fly ash is effective in blocking the anti-air entrainment effect of residual carbon present in said fly ash, without increasing the air entrainment effect by said compound alone.

2. The method according to claim 1, wherein the compound is amphoteric.

3. The method according to claim 2, wherein said amphoteric compound comprises a betaine.

4. The method according to claim 1, wherein said compound comprises an alkyl polyglycoside.

5. The method according to claim 4, wherein said alkyl polyglycoside comprises a $C_8$-$C_{18}$ alkyl polyglycoside.

6. The method according to claim 4, wherein said alkyl polyglycoside comprises a $C_8$-$C_{12}$ alkyl polyglycoside.

7. The method according to claim 1, wherein said compound comprises a triglyceride.

8. The method according to claim 7, wherein said triglyceride contains alkyl chains of 4-22 carbons.

9. The method according to claim 7, wherein said triglyceride contains alkyl chains of 14-18 carbons.

10. The method according to claim 7, wherein said triglyceride comprises an oil selected from the group consisting of rapeseed oil, soybean oil, coconut oil, tall oil, and mixtures thereof.

11. The method according to claim 1, wherein said compound comprises a triglyceride derivative.

12. The method according to claim 11, wherein said triglyceride derivative comprises an alkoxylated triglyceride.

13. The method according to claim 12, wherein said alkoxylated triglyceride derivative comprises an ethoxylated triglyceride.

14. The method according to claim 1, wherein said compound comprises a fatty alcohol.

15. The method according to claim 1, wherein said compound comprises an alkoxylated fatty alcohol.

16. The method according to claim 1, wherein said compound comprises an alkoxylated polyhydric alcohol.

17. The method of claim 1, wherein said cementitious mixture (b) comprises Portland cement, and the ratio of said treated fly ash to said Portland cement is about 5:95 to about 25:75.

18. The method of claim 1, wherein said cementitious mixture (b) comprises Portland cement, and the ratio of said treated fly ash to said Portland cement is at most 40:60.

19. The method of claim 14, wherein said fatty alcohol comprises an alcohol of 6-22 carbon atoms.

20. The method of claim 15, wherein said alkoxylated fatty alcohol comprises an alcohol of 6-22 carbon atoms.

* * * * *